United States Patent
Russo et al.

[15] 3,672,707
[45] June 27, 1972

[54] EXPANSION JOINT

[72] Inventors: Carmela Mary Russo; Baladassare Russo, Jr., both of 16608 Marine View Drive S.W., Seattle, Wash. 98166

[22] Filed: Jan. 2, 1970

[21] Appl. No.: 188

[52] U.S. Cl. ........................................... 285/229, 285/424
[51] Int. Cl. ........................................... F16l 51/02
[58] Field of Search ............... 285/229, 226, 227, 228, 299, 285/300, 301, 424; 138/156, 157, 178

[56] References Cited

UNITED STATES PATENTS

| | | |
|---|---|---|
| 1,416,334 | 5/1922 | Connery ........................... 285/424 X |
| 3,551,009 | 12/1970 | Cammuso et al. ..................... 285/226 |
| 2,797,112 | 6/1957 | Ziebold ............................. 285/286 X |
| 3,099,467 | 7/1963 | Godshalk .......................... 285/229 X |
| 3,254,910 | 6/1966 | Poole et al. ........................ 285/226 |
| 3,365,217 | 1/1968 | Cooper ............................. 285/229 |

*Primary Examiner*—Thomas F. Callaghan
*Attorney*—Christensen & Sanborn

[57] ABSTRACT

An expansion joint is provided whereby any amount of expansion required can be absorbed with one fold only. Designed to be safe for expansion joint failures by eliminating stresses concentration at the corners and to be simple to manufacture and construction assembly.

8 Claims, 13 Drawing Figures

PATENTED JUN 27 1972 3,672,707
SHEET 1 OF 3
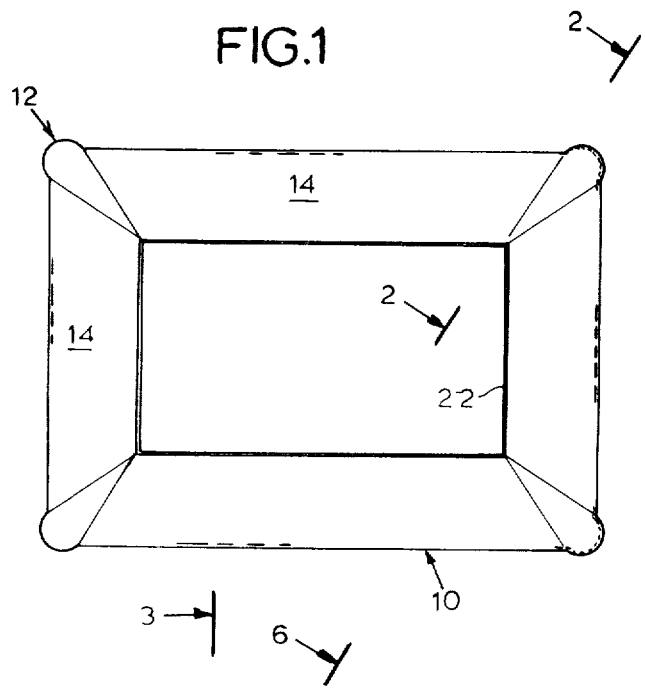
FIG. 1
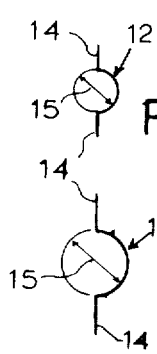
FIG. 4
FIG. 5
FIG. 6
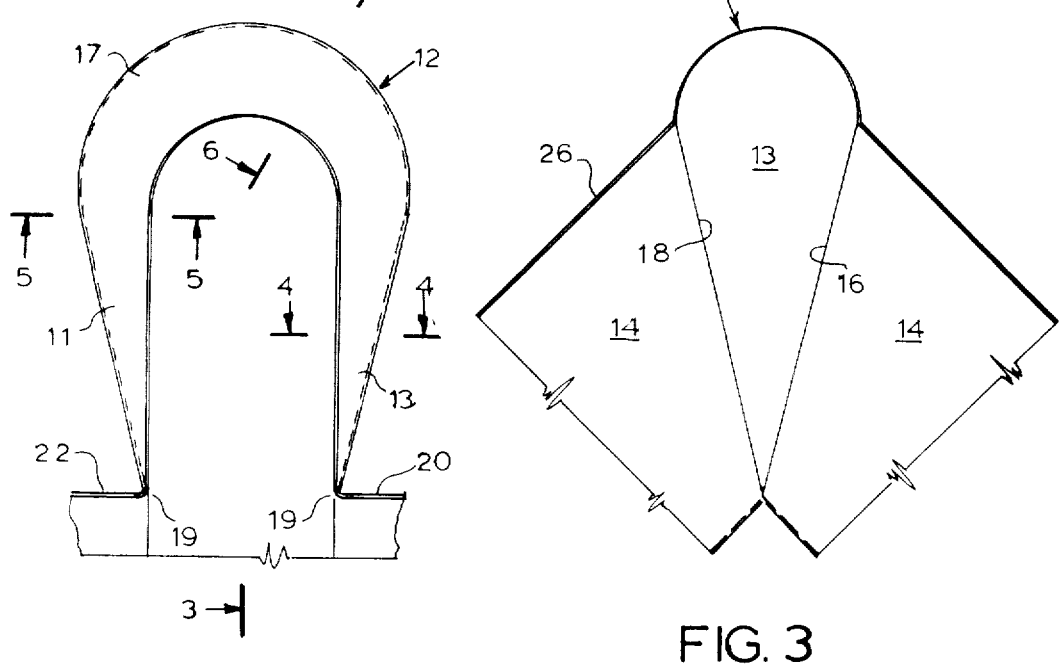
FIG. 2
FIG. 3
INVENTOR
CARMELA MARY RUSSO
*Carmela M. Russo*

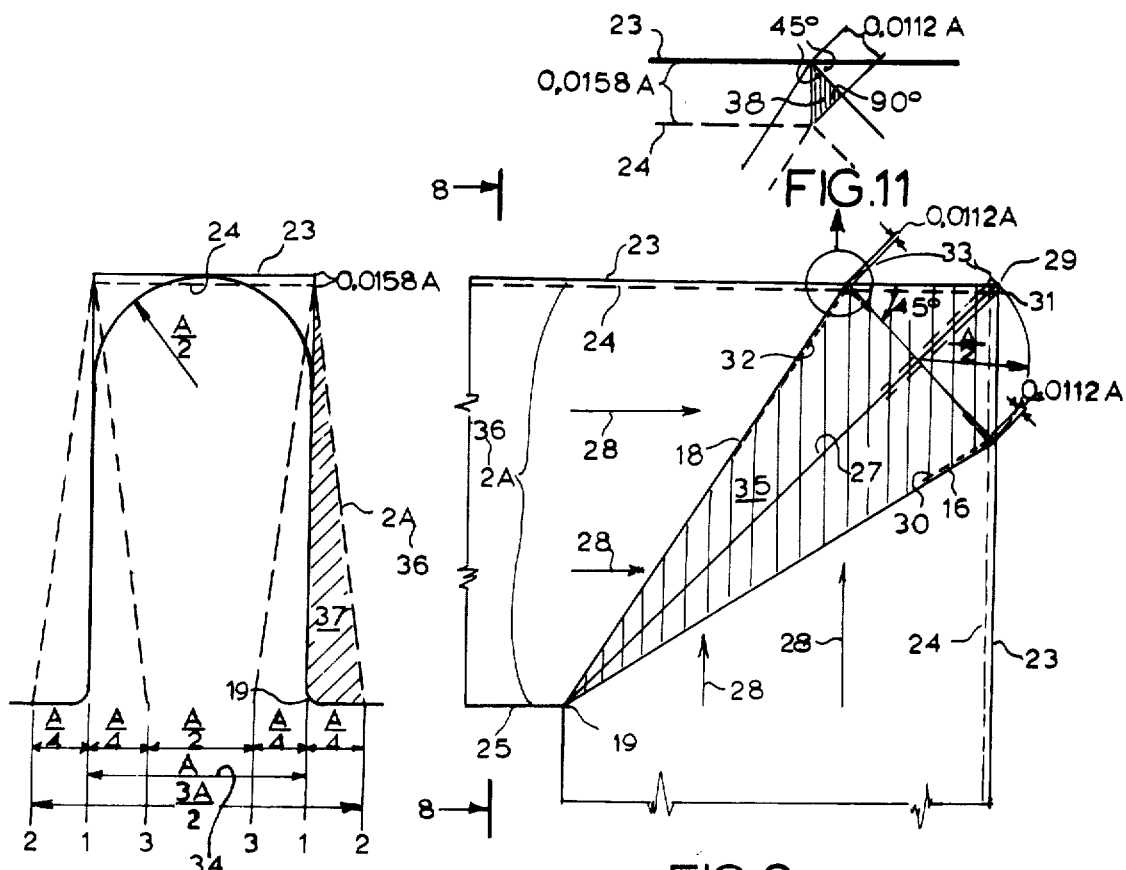
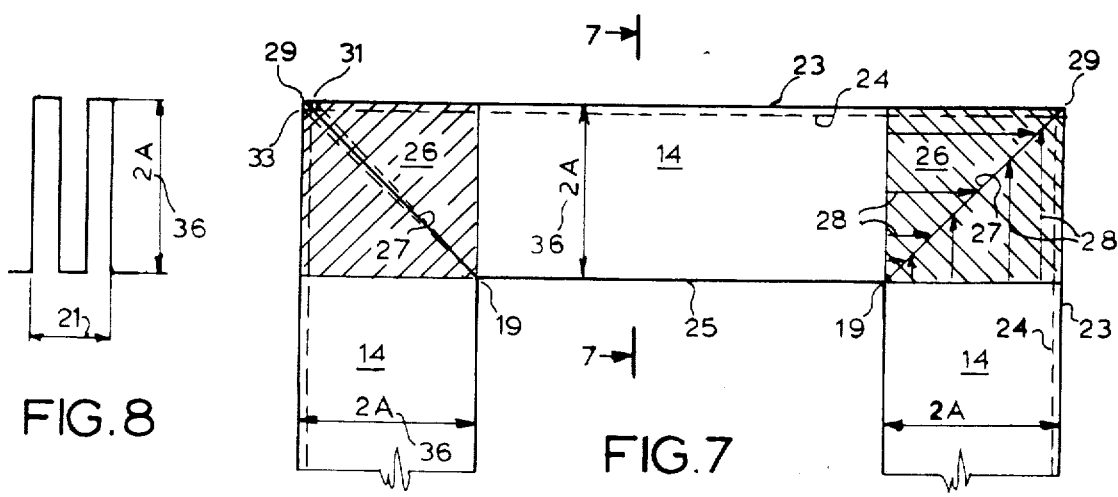

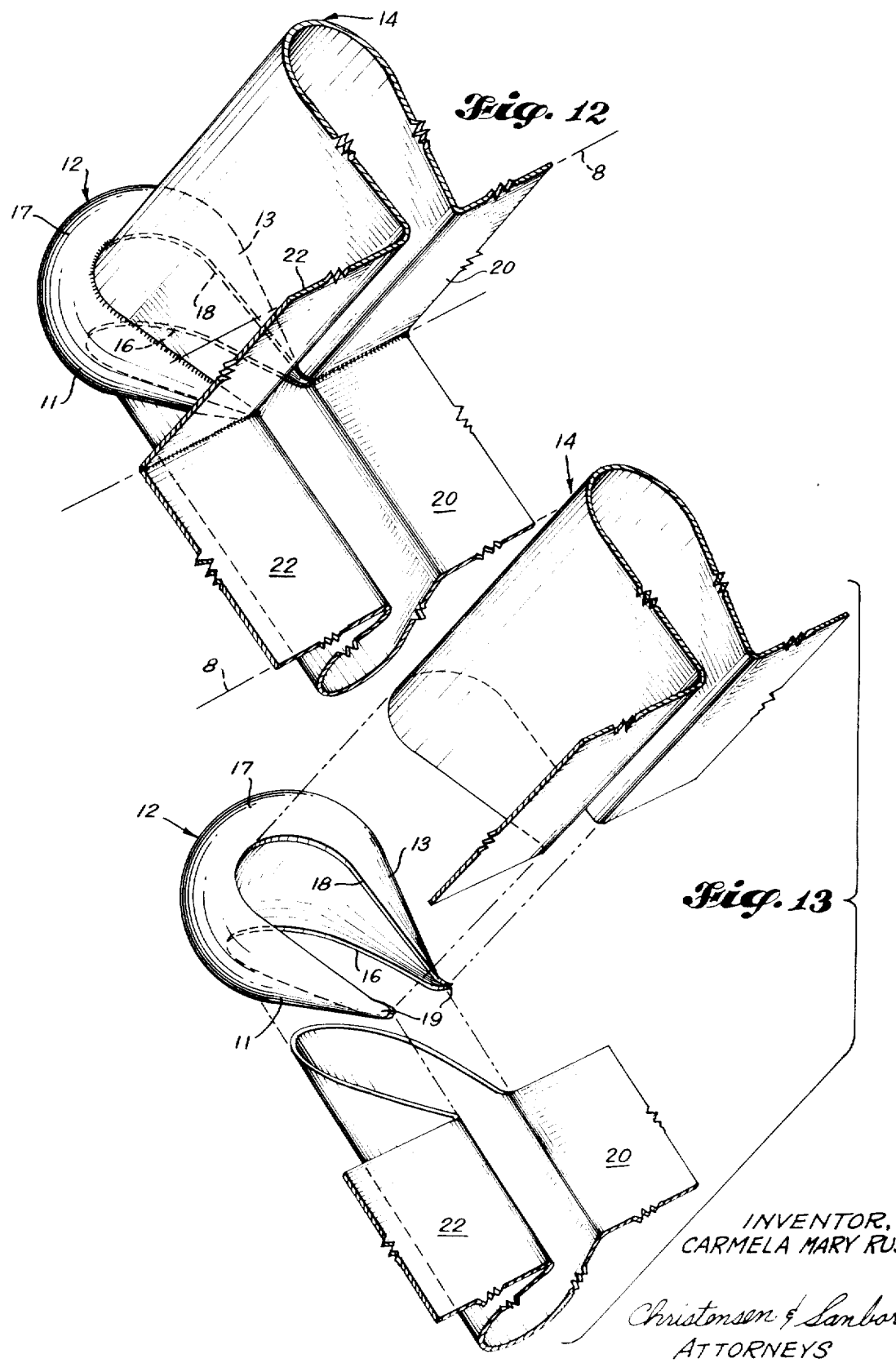

EXPANSION JOINT

The present invention relates to expansion joints, and more particularly, to expansion joints for use in connection with structures subjected to extensive expansion and contraction.

Ordinary structures that are subjected to substantial expansion and contraction forces require a joint that can absorb these changes, whereby the joint is subjected to the forces and stresses created thereby. An object of this invention is to provide an expansion joint that is simple in construction, efficient in operation and economical.

Another object of this invention is to provide an expansion joint that will accommodate any given amount of expansion and contraction required by polygonal conduits, conveying air or gases and subject to low pressures by using one fold only without being damaged or permanently distorted.

Another object of this invention is to eliminate, by reducing to a negligible value the stresses accumulated at the corner of the expansion joint during its operation.

Another object of this invention is to supply the industry with a safe device, that because of its simplicity it is easy to install and insulate and lagged as a plain flue and duct surface.

All the foregoing and still further objects and advantages of this invention will become apparent from a study of the following specification taken in connection with the accompanying drawings, wherein:

FIG. 1 is a side elevation view of one form of expansion joint made in accordance with this invention;

FIG. 2 is an enlarged cross-sectional view taken along line 2—2 of FIG. 1;

FIG. 3 is a sectional view taken along line 3—3 of FIG. 2;

FIGS. 4, 5, and 6 are cross-sectional views taken along lines 4—4, 5—5, 6—6, of FIG. 2;

FIG. 7 is a side elevation of an existing expansion joint;

FIG. 8 is a cross-sectional view taken along line 7—7 of FIG. 7;

FIG. 9 is an enlarged corner section of FIG. 1;

FIG. 10 is a cross-sectional view taken along line 8—8 of FIG. 9,

FIG. 11 is an enlarged area of FIG. 9;

FIG. 12 is a perspective view of one corner of the inventive joint; and

FIG. 13 is an exploded view of the corner seen in FIG. 12.

Referring now to FIGS. 1 through 6, and FIGS. 12 and 13 of the drawings, the joint of the present invention is shown to comprise a polygonal casing 10 that has flexible stress absorbing fold-like sections 12 at the corners of the same, and inverted "U"-shaped, axially-flanged interconnecting sections 14 therebetween. Each of the flexible stress absorbing sections 12 is also of a generally "U"-shaped configuration, and has a single uninterrupted cross section from apex 19 on the flange 20 of one adjacent section 14, to apex 19 on flange 22 of the other section 14, gradually uniformly shaped as a semi-biconotorosphere, the semi-conical radially extending legs of which are seen at 11, 13, connected by an outer semi-torosphere bight 17. Each leg portion 11, 13, is shown to be arcuate in cross-section forming a semicircle, but of conical configuration in side elevation, having edges 16, 18, on each side, secured to the adjacent sections 14. These edges 16, 18, converge inwardly from the bight portion 17 to apices 19 adjacent the inner extremities thereof. The flanges 20, 22 of the sections 14 of the joint, are secured to the flanges of the conduits 8 (FIG. 12).

In use, the joint is secured to the conduits so that any forces of contraction or expansion are transmitted from the securement flanges 20, 22 through the respective legs portion 11, 13, respectively, and to the arcuate outer extremity 17 thereof. Because of the particular shape of the various elements of the stress absorbing sections 12, the circumferential stresses are absorbed thereby so that the parts are not permanently distorted or damaged.

Analyzing an expansion joint corner as in FIGS. 7, 8, 9, and 10, and its resulting stresses, we find that the expansion joint fold increases or decreases the distance 21, when subject to expansion and contraction forces. The projected length of the fold varies proportionally, and the outer edge 23 moves to dotted line 24. This is possible along the rectangular portion 14 of the fold, comprised between the inner 25, and outer edge 23; whereas, the shaded area comprised between two consecutive rectangles 14, forming the expansion joint corners 26, is not free to move. Thus, forces of pressure and traction creates stresses concentrating around the diagonal line 27 of the shaded area, the stresses increase uniformly from the inner apex 19, to the outer apex 29. The intensity is indicated by the length of the arrows 28.

These stresses cause warping, bowing, and even rupturing the expansion joint plate. To keep these stresses within allowable limits of elasticity of the plate forming the joint, expansion joints are formed by numerous adjacent folds to obtain any appreciable value of expansion and contraction, this resulting in complex device requiring reinforcing, guiding, and increasing the chances of failure of an overstressed fold.

If now we cut out the corner along the line 27, of the shaded area 26, we find that all the stresses thereby concentrated disappear and the two edges of the new cut diagonal will overlap along dotted lines 19–31, 19–33. This overlap represents the restrained material.

To accommodate the stress absorbing section 12, we cut out a shaded section of the corner 35, as shown on FIG. 9. The stress absorbing section 12 is now subjected to the action of diametrically opposite forces of compression or traction at the edges 16, 18, of the semicircular structure of 11, 13, and 17. These forces move edges 16, 18, to 30, 32, respectively. By making the sum of the movement of the edges 16–30, 18–32 at any point of the stress absorbing section 12, over the corresponding diameter 15 at that point, (see FIGS. 4, 5, and 6) well within the elastic flexibility of the metal, all the stresses concentration at the corner are consequently eliminated.

By making the stress absorbing section 12 proportioned to absorb any amount of expansion required "A", and this corresponding to the height of the fold 34, FIG. 10, 2A is the width of the fold 36, A/2 is the maximum radius at the apex 29, FIG. 9. By presetting the expansion joint from original position 1—1 to assembled position 2—2, when in operation the expansion joint is compressed to position 3—3, the whole will result in an expansion value $A = 3A/2 - A/2$ By presetting the apex 19 of the joint by $A/4$ the outer edge 23 will move inwardly to 24, from the shaded triangle 37, FIG. 10, we find that the movement is equal to $0.0158 A = 2A - \sqrt{(2A)^2 - (A/4)^2}$. From the shaded triangle 38 of FIG. 11, the angles comprised are 45°, and 90° so that two sides are equal to $$\frac{0.0158A}{\sqrt{2}} = 0.0112A$$

from which results a constant flexibility factor of $2 \times 0.0112A/A = 0.0224$.

The following tabulation illustrates that one fold absorbs any given expansion A.

| A expansion required inches | 2A fold width inches | 0.0112A compression or traction factor | 0.0224A total compr. or traction inches | 0.0224A / A flexibility factor |
|---|---|---|---|---|
| 1½ | 3 | 0.0168 | 0.0336 | 0.0224 |
| 3 | 6 | 0.0336 | 0.0672 | 0.0224 |
| 4½ | 9 | 0.0504 | 0.1008 | 0.0224 |
| 6 | 12 | 0.0672 | 0.1344 | 0.0224 |
| 7½ | 15 | 0.0840 | 0.1680 | 0.0224 |
| 9 | 18 | 0.1008 | 0.2016 | 0.0224 |
| 10½ | 21 | 0.1170 | 0.2340 | 0.0224 |
| 12 | 24 | 0.1344 | 0.2688 | 0.0224 |
| 15 | 30 | 0.1680 | 0.3360 | 0.0224 |
| etc. | | | | |

If we press in our hand between the index and the thumb, a section of No. 16 gage thick 3 inch pipe, we will find appreciable resistance before the pipe flexes. But if we now cut off a section of the pipe shell, parallel to the axis, and now we press the cut ends as before, we will find it easy to flex the pipe. This is the nature of the section absorbing 12 hereby described with the resulting negligible flexibility of 2.24 percent.

What is claimed is:

1. In combination, means defining a pair of spaced coaxial conduits, and an expansion joint interposed in the space between the conduits, in connection therewith, said joint comprising an annular casing which protrudes radially from the outer periphery of the conduits and the main body of which has an open-cornered polygonal cross-section transverse the axis thereof, and an inverted generally U-shaped configuration in planes parallel to said axis, the opposing sides of which configuration are transverse the axis, there being inverted generally U-shaped folds closing the openings at the corners of the body, the bight portions of which folds are radially convexly protruding from the outer periphery of the body in the polygonal cross-sectional plane of the same, and the leg portions of which folds are axially convexly protruding from the sides of the body and have matching, oppositely disposed arcuate cross sections in planes parallel to the axis of the conduits, which taper relatively conically inwardly toward the conduits, from the outer periphery to a point adjacent the inner periphery of the body, respectively.

2. The combination according to claim 1, wherein the folds have semi-circular cross sections in the polygonal cross-sectional plane of the body.

3. The combination according to claim 2, wherein the folds have complemental semi-circular cross sections in planes parallel to the axis of the conduits.

4. The combination according to claim 1, wherein the folds taper to apices at the outer peripheries of the conduits.

5. The combination according to claim 1, wherein the sides of the body are disposed in spaced parallel planes transverse the axis of the conduits.

6. The combination according to claim 1, wherein the conduits are disposed on a rectilinear axis and also have a polygonal cross section transverse the axis thereof.

7. An expansion joint for interconnecting a pair of spaced coaxial conduits, comprising means defining an annular casing, the main body of which has an open cornered polygonal cross section transverse the central axis thereof, and an inverted generally U-shaped configuration in planes parallel to said axis, the opposing sides of which configuration are transverse the axis, there being inverted generally U-shaped folds closing the openings at the corners of the body, the bight portions of which folds are radially convexly protruding from the outer periphery of the body in the polygonal cross-sectional plane of the same, and the leg portions of which folds are axially convexly protruding from the sides of the body and have matching, opposing disposed arcuate cross sections in planes parallel to the axis of the body, which taper relatively conically inwardly toward the axis from the outer periphery to a point adjacent the inner periphery of the body, respectively.

8. The expansion joint according to claim 7, wherein the bight portions and the leg portions of the folds have corresponding semi-circular cross sections in the respective planes thereof.

* * * * *

PO-1050
(5/69)

UNITED STATES PATENT OFFICE
CERTIFICATE OF CORRECTION

Patent No. 3,672,707                          Dated   June 27, 1972

Inventor(s)    Carmela Mary Russo et al.

It is certified that error appears in the above-identified patent and that said Letters Patent are hereby corrected as shown below:

Claim 7, line 21, "opposing" should read -- oppositely --.

Signed and sealed this 27th day of February 1973.

(SEAL)
Attest:

EDWARD M. FLETCHER, JR.                    ROBERT GOTTSCHALK
Attesting Officer                          Commissioner of Patents